United States Patent [19]

Moret et al.

[11] Patent Number: 4,797,524

[45] Date of Patent: Jan. 10, 1989

[54] APPARATUS AND METHOD FOR REGENERATING ACTIVE CARBON

[75] Inventors: Jacques Moret, Saint Pardoux; Jean-Maurice Fosset, Nantiat; Jacques Couturier, Razes; Noël Viard, Bessines, all of France

[73] Assignee: Compagnie Generale des Matieres Nucleaires, Velizy Villacoublay, France

[21] Appl. No.: 864,918

[22] Filed: May 20, 1986

[51] Int. Cl.$^4$ .............................................. H05B 6/10
[52] U.S. Cl. ................................. 219/10.69; 219/10.51; 219/10.65; 219/10.57; 373/59; 373/140; 373/142; 373/58; 266/148; 266/192; 266/183
[58] Field of Search ............... 219/10.51, 10.69, 10.65, 219/10.49 R, 10.57, 10.73, 10.75; 373/59, 56, 142, 140, 138; 266/154, 184, 176, 191, 192, 197, 145, 148, 183

[56] References Cited

U.S. PATENT DOCUMENTS

| | | | |
|---|---|---|---|
| 1,440,194 | 12/1922 | Winjnberg | 502/38 |
| 1,440,195 | 12/1922 | Wijnberg | 202/118 |
| 2,365,346 | 12/1944 | Kruh | 373/59 |
| 2,519,481 | 8/1950 | Kubie et al. | 219/10.51 |
| 2,786,747 | 3/1957 | Gallusser | 373/59 |
| 3,222,491 | 12/1965 | Schmid et al. | 219/10.51 |
| 3,226,465 | 12/1965 | Downing et al. | 219/10.51 |
| 3,535,482 | 10/1970 | Kluck | 219/10.65 |
| 3,578,070 | 5/1971 | Martin | 266/192 |
| 3,909,244 | 9/1975 | Rose et al. | 266/192 |
| 4,223,274 | 9/1980 | Kijmaga et al. | 219/10.51 |

FOREIGN PATENT DOCUMENTS

| | | |
|---|---|---|
| 511899 | 1/1921 | France . |
| 558850 | 9/1923 | France . |
| 27063 | 4/1924 | France . |
| 616811 | 2/1927 | France . |
| 53-11192 | 2/1978 | Japan . |
| 55-126524 | 9/1980 | Japan . |
| 362609 | 12/1931 | United Kingdom . |

OTHER PUBLICATIONS

Fuji Denki Seizo K.K., *Patents Abstracts of Japan,* vol. 3, No. 87 (C-53), p. IC53 (1979).
Kurita Water Industries, Ltd., *Chemical Abstracts,* vol. 94, No. 20, p. 113, 158803 g (1981).
Masuda et al., *Chemical Abstracts,* vol. 89, No. 8, p. 97, 61479x (1978).
Tokyo Koki K.K., *Patents Abstracts of Japan,* vol. 1, No. 28, p. 1369C76 (1977).
Chauveau, "Le Réacteur à Infrarouge . . . " *CFE* (no date).

*Primary Examiner*—M. H. Paschall
*Attorney, Agent, or Firm*—Larson and Taylor

[57] ABSTRACT

The invention relates to an apparatus for the regeneration of active carbon comprising particularly:
  a hopper for introducing the active carbon;
  a reactor (7) delimited by an elongated shaped sheath;
  a continuous Archimedes screw (10) situated inside the reactor to transport the active carbon to be regenerated;
  structure for heating by resistances (8), arranged inside the sheath of the reactor;
  structure situated above the unload end of the reactor (19) and in communication with the reactor, particularly for removing the gases;
  a coffer into which the Arichmedes screw unloads;
  structure for communication with the reactor and situated on the one hand close to the input of the reactor and on the other hand along the reactor to regulate the pressure inside the reactor and to inject steam.

This apparatus for regenerating active carbon enables the powder active carbon to be regenerated efficiently.

27 Claims, 4 Drawing Sheets

APPARATUS AND METHOD FOR REGENERATING ACTIVE CARBON

The invention relates to a method and an apparatus for regenerating active carbon.

Active carbon, which may be in the form of grains or of powder, has a porous internal structure, which confers on it a great absorbent power and enables it to adsorb gases and vapors in gases, as well substances dissolved or dispersed in liquids.

This explains why active carbon, whether in the form of granular particles, or in the form of pulverulent particles, is used in numerous treatments, in particular of purification, especially treatments for the purification of gaseous or aqueous wastes being discharged from factories and other installations.

However, in the course of the treatment in which active carbon is used, adsorption continues and the active carbon is charged and becomes saturated with adsorbed substances which constitute contamination products, which causes the carbon to lose its adsorption properties and renders it inactive.

Consequently, once it is saturated with these contamination products, the active carbon must be either thrown away, or reactivated by elimination of the contaminating substances.

In addition, the manufacture itself of the active carbon may introduce binding agents, which it is necessary to remove before the use of the active carbon in the various processes of purification treatment.

The reactivation of the active carbon is generally done by heating the carbon to pyrolyse the contaminating substances which must be removed from the pores of the carbon particles, without burning the carbon particles themselves.

Numerous apparatuses have already been proposed to regenerate active carbon, but the latter show one and/or other of the drawbacks mentioned below: they are particularly mechanical problems, for example breakdowns for which it is difficult to cope with because of the complex mechanical structure, the inhomogeneity of the temperature inside the furnace, low heat efficiencies which may be correlated both with the mechanical configuration of the device as well as with the nature of the heating device, risks of burning and of losing a considerable portion of the carbon particles by reason of the difficulty of controlling the temperature, and high costs of the device.

Applicant company has proposed a device for regenerating active carbon, whether it is in powder or in grains, which overcomes the above-mentioned drawbacks.

More particularly, the invention relates to a regeneration apparatus for active carbon, using a relatively simple mechanical configuration.

It is also an object of the invention to provide an apparatus for regenerating active carbon, in which the temperature is substantially homogeneous, in particular in the zone of the reactor in which the pyrolysis of the contaminating substances takes place.

It is also an object of the invention to provide a regeneration apparatus of active carbon in which the heating device enables good thermal efficiency to be obtained.

It is also an object of the invention to provide an apparatus eliminating the risks of combustion of the active carbon and the risks of explosion.

It is also an object of the invention to provide an apparatus for regenerating active carbon in the form of pulverulent particles without having large losses of active carbon, in spite of the fineness of the particles.

It is also an object of the invention to provide an apparatus for the regeneration of active carbon, much less expensive than apparatuses known hitherto.

This has been achieved by a method consisting of introducing the active carbon to be regenerated, in the form of powder or of grains, into a reactor equipped so as to be fluid-tight with respect to oxygen, to apply heat so as to have a substantially homogeneous temperature in the reactor whose atmosphere is saturated with steam, by means of resistances or of magnetic induction, controlling the pressure so that it is substantially equal to atmospheric pressure, causing the active carbon which is to be regenerated to advance so that there is the minimum drive of the finest particles (called below "dusts") into the atmosphere of the reactor, these conditions being such that there is complete elimination of the contaminating substances by pyrolysis, without there being any considerable loss of the active carbon to be regenerated particularly by combustion of the particles themselves or drive of carbon dusts.

The apparatus according to the invention comprises:

a vertically positioned hopper, comprising an upper feed orifice for the active carbon to be regenerated and a lower unload orifice for said regenerated active carbon;

means for unloading from a hopper, the active carbon to be regenerated;

a reactor bounded by a sheath of elongated shape, having an input end and an output end, the input end of the reactor being in communication with the lower unloading orifice of the hopper;

means for providing the fluid-tightness of the reactor with respect to oxygen and situated above the input end of the reactor;

a shaft equipped with blades or a continuous Archimedes screw located inside the reactor to transport the active carbon to be regenerated, from the input end of the reactor to the output end of the reactor;

means for heating by a magnetic induction or by resistances, positioned outside the sheath of the reactor and regulatable, so as to have a substantially uniform temperature inside the above-said reactor and sufficient to pyrolyze the contaminating substances of the active carbon;

means situated above the unload end of the reactor and in communication with the reactor, for removing the gases and for condensing a part of the steam from the reactor and for trapping the flying carbon particles;

a coffer situated beneath the above-said condensation means, into which unloads the Archimedes screw or the shaft equipped with blades, which coffer communicates with a cooling tank and is equipped with means to spray with water the regenerated active carbon coming from the reactor and unloaded by the Archimedes screw or bladed conveyor shaft and thus cause it to fall into the cooling tank;

and to condense another part of the steam as well as the gases which come from the reactor;

the above-said condensation of the steam resulting in a reduced pressure in the reactor, which causes the circulation of the steam inside the reactor in flowing with the carbon transported to the inside of the reactor;

means of communication with the reactor and situated on the one hand close to the input of the reactor and on the other hand along the reactor to regulate the pressure in order that inside the reactor it may be close to atmospheric pressure, by the addition, as the case may require, of neutral gas and/or steam;

means in communication with the reactor and situated on the one hand close to the input of the reactor and on the other hand along the reactor to inject the steam in order that the atmosphere inside the reactor may be saturated with water vapour.

The structure of this apparatus enables, in the practising of the method of regenerating active carbon, unexpectedly, reduction in the amount of energy consumed per kilogram of active carbon to be regenerated, whilst preserving a good quality of regeneration and regulating the flow rate of active carbon introduced into the hopper and the stay time inside the reactor.

The use of this regeneration apparatus enables pyrolysis of the contamination substances which are to be eliminated to be carried out, pyrolysis of these substances resulting in the appearance in the atmosphere inside the reactor of gases such as saturated hydrocarbons (methane, butane, etc.) and carbon monoxide.

The "atmosphere inside the reactor", corresponds to the volume occupied by the whole of the gases in the reactor vessel, it being understood that the volume unoccupied by the gases is occupied by the active carbon and the bladed shaft or the Archimedes screw.

It is necessary for the atmosphere inside the reactor to be saturated with water vapour in order that the quality of the regenerated active carbon may be satisfactory.

Although the role of the water vapour is incompletely understood with respect to the regeneration of the active carbon, once the contamination substances have been pyrolyzed, the water vapour acts physically on the active carbon particles to regenerate the porosity. It may therefore be considered that the water vapour plays a part as a reagent in the regeneration of the active carbon.

The "atmosphere saturated with water vapour", means a gaseous volume in which the water vapour represents the major portion of the total gaseous volume, generally higher than 90%.

It is also necessary for the reactor to be fluid-tight relative to air, particularly with respect to oxygen, in order to avoid any risk of explosion and inflammation of the carbon particles themselves.

As regards the device to cause the active carbon to advance inside the reactor, it has been found that the use of a continuous Archimedes screw or of a discontinuous bladed shaft presents the unexpected advantage of minimizing the drive of the finest particles (dusts) of carbon into the atmosphere inside the reactor. This consequently avoids the risks of explosion, as well as the losses of carbon to be regenerated, especially when the latter is in powdered form.

According to a preferred embodiment of the invention, the hopper is a tank of a shape such that the surface of the upper orifice is larger than that of the lower orifice, for example a conical shape of which the most flared part is the upper orifice, through which the active carbon to be regenerated is introduced.

According to another preferred embodiment of the invention, means of discharging into the interior of the hopper are constituted by a continuous vertical Archimedes screw, whose motion is ensured by a motor situated, for example, above the hopper. The lower end of this Archimedes screw comes out upon the input end of the reactor and when the screw is in motion, it pushes the active carbon to be regenerated from the hopper into the reactor.

Advantageously, the axis of symmetry of the cone corresponds to the axis of the Archimedes screw.

In the lower part of the hopper, this Archimedes screw is equipped advantageously with blades, which are advantageously flat, which have the shape of elongated parallelepipeds, and of which the smallest sides measure, for example, about 1 cm.

These blades are advantageously welded so that the straight segments which define their largest side are perpendicular to the axis of the screw. Each blade is advantageously inclined with respect to the base plane of the cone of the hopper, in a direction substantially parallel with the plane defined:

by the straight segment which passes through the two points of intersection of the helix of the screw and the two largest sides of the parallelepiped of the blade;

and by the line perpendicular to said segment, and which cuts the axis of the screw.

The length of these blades must be such that it permits the active carbon to be detached from the inner surface of the wall of the hopper.

Advantageously, each flat blade has a dimension substantially equal to the value of the radius of the circle formed by the intersection of the space of the hopper and the plane in which said blade rotates, whilst remaining preferably slightly less than this value, in order to avoid friction between the helix of the Archimedes screw and the inner surface of the cone.

Advantageously, the distance between the edge of a blade and the inner surface of the hopper is, for example, about 1 mm.

These flat blades are advantageously fixed to the part of the screw situated along about the lower third of the axis of symmetry of the cone of the hopper. The distance between two adjacent blades is advantageously equal to about the length of the pitch of the Archimedes screw.

In a preferred embodiment of the invention, the lower discharge orifice of the hopper communicates with the input end of the reactor through a tube, called below a feed-tube, whose longitudinal axis of symmetry is an extension of the axis of symmetry of the cone of the hopper.

In other words, the longitudinal axis of the feed-tube is an extension of the axis of the Archimedes screw.

Advantageously, the Archimedes screw is extended into the feed-tube along the longitudinal axis of the latter and thus comes out upon the input end of the reactor.

The diameter of the feed-tube is such that it is substantially equal to the diameter of the Archimedes screw. The diameter of the Archimedes screw will be called below, the diameter of the circle obtained by projection of the helix of the screw along the axis of the screw, on to a plane perpendicular to the axis of the screw.

In this manner, the edge of the helix of the Archimedes screw is almost in contact with the inner surface of the feed-tube, which prevents the active carbon from adhering to the inner wall of the feed-tube, since at each point of the inner surface of the feed-tube, the carbon is detached by the passage of the helix; the diameter of the Archimedes screw is preferably slightly smaller than the diameter of the feed-tube to avoid friction between the helix and the inner surface of the feed-tube.

Advantageously, the distance between the edge of the helix of the screw and the inner surface of the feed-tube is, for example, about 1 mm.

The presence of the feed-tube enables on the one hand the guidance of the Archimedes screw to be ensured on the other hand the fluid-tightness of the reactor with respect to the air to be ensured. To avoid the problems of explosion inside the reactor, it is necessary, in fact, for the air contained in the hopper not to penetrate into the reactor. In the course of the processing, this fluid-tightness can be produced by means of the active carbon present in the feed-tube, to the extent that the active carbon occupies a sufficient height of the feed-tube to ensure this fluid-tightness.

Practically, when the amount of active carbon to be regenerated contained in the hopper has been introduced into the reactor, the rotary motion of the Archimedes screw is stopped at the moment when the upper surface of the active carbon coincides substantially with the upper part of the feed-tube; the carbon mass situated in the feed-tube then forms a tight plug between the air, particularly the oxygen, and the reactor which permits the problems of the inflammibility of the active carbon, and even of an explosion to be avoided.

In a preferred embodiment of the invention, the reactor is constituted by a horizontal cylinder.

Advantageously, the ratio between the total length of the cylinder of the reactor and its diameter is comprised from 8 to 15, and is particularly comprised from 10 to 12, and is advantageously 12.

The active carbon is transported from the input of the reactor to the unload end of the latter by a shaft equipped with blades or by a continuous Archimedes screw.

The Archimedes screw is advantageously preferred.

As regards the shaft equipped with blades, the latter have the shape of a parallelepiped or of a trapezoid and the spacing between two consecutive blades is about 10 cm, their angle with respect to the axis of the shaft being advantageously about 45°.

The axis of the Archimedes screw or of the blade-fitted shaft may be merged with the axis of the reactor.

In the case where the axis of the Archimedes screw is coincident with the axis of the reactor, the diameter of the Archimedes screw is substantially equal to the inner diameter of the reactor, in order that there may not be formation in the bottom of the reactor of a plug of active carbon whose height would be equal to the difference in length between the inner radius of the reactor and that of the screw.

The diameter of the Archimedes screw corresponds to that already defined above.

Advantageously, the diameter of the Archimedes screw is about 1 or 2 mm less than the inner diameter of the reactor, to avoid friction between the helix of the Archimedes screw and the inner surface of the reactor.

Advantageously, the axis of the Archimedes screw is de-centered with respect to the axis of the reactor.

Advantageously, the axis of the Archimedes screw is situated beneath the axis of the reactor and is perpendicular to the radius which joins the axis of the reactor to the lower generating line of the reactor.

The distance between the axis of the Archimedes screw and the axis of the reactor, called below de-centered distance, is about 8 mm to about 12 mm, and advantageously about 10 mm.

In the case of the de-centering, it is advantageous to select on the one hand the distance of decentering and on the other hand the value of the diameter of the Archimedes screw so that there is about 1 or 2 mm between the Archimedes screw and the lower generating line of the reactor.

The de-centering is for the purpose of leaving a free space in the upper part of the reactor, which facilitates the flow of the stream of gases present in the reactor.

It is advantageous for the diameter of the Archimedes screw not to be too small with respect to the inner diameter of the reactor, to avoid an accumulation of the carbon introduced into the reactor, on the sides of the reactor.

In any event, the layer of active carbon must have a height such that its upper surface is situated below the axis of rotation of the Archimedes screw and in practice must not exceed two-fifths of the diameter of the reactor.

Besides, considering that the regeneration of the active carbon is a reaction which takes place in the mass, it must not, in fact, happen that the carbon layer is too thick in order that even the active carbon situated in the lowest part of the layer may also be regenerated.

As regards the movement of the screw inside the reactor, it must be such that it meets the following conditions: be sufficiently slow to avoid the drive of carbon dust into the atmosphere of the reactor, considering the very low density of the powdered active carbon, and be such that the active carbon to be regenerated stays for a sufficient time for the regeneration to be of good quality but be such that it does not stay more than about one hour, under the conditions of temperature and the other conditions of reaction selected, in order to avoid large losses of active carbon and to avoid particularly for the active carbon losses to be higher than about 15%.

In fact, if the speed of advance of the screw inside the reactor is too rapid, there are movements in the active carbon sufficient for the active carbon dust to fly out from the active carbon layer into the atmosphere of the reactor, which has the consequence of plugging the means of evacuating gases and regulating pressure and a loss of carbon.

Besides, if the speed of advance is too rapid, the pyrolysis of the contamination substances is incomplete and the regeneration is of poor quality. If the active carbon remains too long, there may occur a grilling of carbon particles themselves.

As regards the heating device, it is either a magnetic induction heating, or a resistance heating.

It must be possible to control this device so as to establish inside the reactor, a practically homogeneous temperature, particularly in the two latter thirds of the reactor.

This device must be such that the temperature inside the furnace is from 400° to about 1000° C., particularly from about 400° to about 800° C., advantageously from about 400° to about 600° C., and more particularly about 500° C.

The choice of the temperature inside the reactor brings into play at least two parameters which are respectively the quality of regeneration of carbon, and the loss by grilling the carbon to be regenerated.

The temperature of 500° C., which is not critical, enables at the same time a satisfactory quality of regeneration to be had, without too great a loss by grilling to occur, namely a value not higher than about 10%.

Above 500° C., there is a much more considerable loss by grilling. By way of indication, a temperature of about 800° C. leads to a loss of about 25% by grilling the active carbon. Above 500° C., the quality of regeneration cannot be sufficient, since the contamination substances cannot be totally pyrolyzed.

Recourse may be had to a single resistance situated on the outside of the reactor.

However, recourse is advantageously had to heating by several resistances, positioned one beside the other along the outer surface of the reactor.

This heating by resistance, discontinuously, enables the regulation, for each of the resistances, of the energy to be dissipated, as a function of the zone of the reactor that it must heat. This permits a practically homogeneous temperature to be obtained, and also the consumption of energy to be optimized.

In fact, the amount of energy necessary at the input of the furnace is greater than that necessary at the end of the furnace, since at the input of the furnace, the water contained in the active carbon to be regenerated must be vaporized, and the active carbon heated to the reaction temperature, whilst at the end of the furnace, the reaction temperature has to be maintained.

In addition, each of the resistances may be regulated individually according to the amount of energy desired.

Advantageously, the resistances are 4 to 6 in number, corresponding to different zones that it is possible to define as indicated below by way of example.

In the case where there are 6 resistances, it is possible to define, for example, 4 zones.

The first resistance enables the vaporization of the water contained in the active carbon to be regenerated (zone 1).

From the second resistance, or from the middle of the second resistance, there is drying and rise in temperature to a temperature practically equal to the reaction temperature (for example 500° C.). The regeneration starts in this corresponding region of the reactor, (zone 2).

The third resistance defines the third zone and corresponds to the zone where the temperature reaches the value of the reaction temperature.

As regards the fourth, fifth and sixth resistances, the temperature is the reaction temperature for the regions concerned and there is regeneration of the active carbon.

The number of resistances can also be selected so that each is about 40 to about 60 cm long.

As far as the heating resistances are concerned, recourse is advantageously had to heating shells which engirdle the reactor, positioned conjointly over the outer surface of the latter, and provided on their upper surface with an insulating material, such as glass wool or a silica fiber agglomerate marketed under the name Kerlane 45, distributed by LAFARGE REFRACTAIRE.

The temperature of the carbon inside the reactor may be checked by probes, distributed over the length of the reactor.

Means in communication with the reactor and positioned along the latter enable control of the pressure and the water vapor content inside the reactor.

It is in fact necessary for the pressure inside the reactor, to be close to atmospheric pressure.

In fact, when the pressure is higher than atmospheric pressure (over-pressure), the drive of fine particles of dust is induced from the carbon layer into the atmosphere of the reactor; over-pressure conjugated with the presence of the carbon dust in the reactor results in explosion risks inside the reactor.

In addition, when there is too much dust in the atmosphere of the reactor and excess pressure, the means of regulating the pressure and of regulating the water vapor may be clogged by reason of the formation of a carbon pulp.

When the pressure is lower than atmospheric pressure (under pressure), the entrance of air, hence oxygen in particular, is induced, which must obviously be avoided by reason of the problems of inflammability of the active carbon and possibly of explosion.

As regards the oxygen and the dusts, which are capable of resulting in inflammability of the active carbon, and possibly explosions, the content of oxygen must not exceed about 10% with respect to the total gases and the atmosphere as a reactor must not contain more than 50 g of solid particles of carbon per m3 of normal gas, that is to say of gas brought back to normal temperature.

To avoid the inflammability of the active carbon and possibly explosion, it is also necessary for the butane content to be less than about 1.8% and the CO content to be less than about 12%, these two gases arising from the pyrolysis of the contaminating substances.

The checking of the pressure inside the reactor is done, for example, by means of water columns.

The checking of the content of solid material in the atmosphere of the reactor is done, for example, by means of a conventional device filtering the gases at the outlet of the evacuation means.

The checking of the content of gas such as $O_2$, CO, methane, butane and steam is carried out, for example, by means of tubes marketed under the name DRAEGER tubes.

The means for regulating the pressure and the content of water vapor are advantageously constituted by common devices. They are advantageously situated close to the input end of the reactor and may be constituted by a chimney or a vent.

The purpose of this chimney or this vent is particularly to avoid ascents of vapor into the hopper.

Other means of regulating pressure and the content of steam are in communication with the reactor and positioned along the latter. They may be constituted by injectors.

The devices for regulating the pressure and water vapor, whether chimney, vent or injector, enable particularly, in the case of excess pressure, the escape of the steam or in the case of under pressure, the addition of steam or of neutral gas, such as argon and particularly nitrogen and in the case of insufficient steam, the addition of steam.

The steam comes in part from the vaporization of the water contained in the active carbon to be regenerated.

The steam may be added either in the form of water, which is vaporized under the effect of the temperature of the reactor, or as such.

In practice, at the beginning of the treatment of regeneration of the active carbon, steam is advantageously added at the same time to saturate the atmosphere with water vapour, necessary for the regeneration reaction, and to establish a pressure substantially equal to the atmospheric pressure and to limit the risks of explosion.

When the reaction is terminated, neutral gas is advantageously added to regulate the pressure, since the addition of steam to regulate this pressure could result in the agglomeration of carbon dusts, under the action of the water produced by condensation of the steam by reason of the drop in temperature.

As regards the end of the reactor, it opens at a device which is coupled thereto, which permits condensation of a part of the steam which comes from the reactor.

The condensation of the steam enables the trapping of the fine particles of flying dust at the end of the reactor.

This device has advantageously the shape of a chimney, whose aperture is adjustable.

Advantageously, the Archimedes screw or the blade-fitted shaft-protudes from the unload end of the reactor and passes through the space directly situated under the abovesaid condensation device for the steam.

In the vertical prolongation of the abovesaid device, there is a device called below a recovery device.

This recovery device comprises:

a coffer, particularly parallelepipedic, at which opens the Archimedes screw or blade-fitted shaft;

a water tank, into which the coffer dips and into which the active carbon which is transported to the unloading end of the reactor, falls.

This water tank is advantageously kept at ambient temperature by a heat exchanger.

This coffer is advantageously equipped with means which spray with water the carbon coming from the unloading end and facilitates to unload the regenerated active carbon. There is therefore a water-carbon suspension in the tank, which forms a dilute pulp of active carbon.

This suspension is advantageously kept homogeneous by a stirrer.

These means which spray water have also the function of absorbing a part of the water vapour which comes from the reactor, remembering that another part of the water vapour is condensed in the condensing device mentioned above.

These means which spray water are advantageously constituted by waterfalls which are preferably crossed.

The reduced pressure produced in the reactor by condensing the water steam enables the afflux of the water vapour in cocurrent with the active carbon.

The two waterfalls can be supplied from the cooling tank by a centrifugal pump, which takes up a portion of the dilute pulp of active carbon, from the tank.

A volumetric pump takes the carbon pulp and directs said pulp to an installation intended to recover the regenerated active carbon, in dry form or to an installation in which the regenerated active carbon is directly used.

Advantageously, a ball-cock compensates with fresh water or with recycled water the volume taken off and keeps the level constant in the tank.

The invention relates also to a method of regeneration of active carbon, which comprises the steps described below:

the active carbon is introduced into a hopper positioned vertically comprising an upper orifice for introduction of the active carbon to be regenerated and a lower orifice for unloading said active carbon to be regenerated;

means are put into operation to advance the active carbon inside the hopper and unload it into a reactor, of which the output end is in communication with the lower unload orifice of the hopper;

the operation of the means which cause the active carbon to advance into the hopper is stopped when the amount of active carbon that it is desired to regenerate has passed through the hopper, so as to leave in the lower part of the hopper, a sufficient amount of active carbon to provide the fluid-tightness of the reactor relative to the air;

the heating of the reactor is placed in operation, regulated so that the temperature inside the reactor is practically homogeneous;

the Archimedes screw—or bladed shaft—which passes longitudinally through the reactor is placed in operation; it is intended to transport the active carbon from the input end of the reactor to the unload end at a speed such that the movement of the carbon particles is sufficiently low so that no active carbon dust is driven into the atmosphere of the reactor;

at the end of the reactor, a part of the water vapour which comes from the reactor is condensed by condensing means, and thus the flying dust particles are trapped;

the regenerated active carbon is caused to fall into a coffer whose upper part is equipped with means to spray with water the regenerated active carbon coming from the reactor, which coffer dips into a water tank;

another portion of the steam and of the gases resulting from the pyrolysis of the reactor is in this way condensed by the water spraying means and a reduced pressure is created in this way inside the reactor, which causes the movement of the gases and of the water vapour inside the reactor in cocurrent with the movement of the active carbon transported inside the reactor;

the pressure inside the reactor is controlled in order that it may be equal approximately to the atmospheric pressure by means enabling the removal of the water vapour or of the gases contained inside the reactor, to avoid excess pressure, or enabling the introduction of a neutral gas or water vapour in the case of reduced pressure;

the content of steam inside the reactor is regulated by means enabling the introduction of steam in order that the atmosphere of the reactor may be saturated with water vapor; the order of these various steps indicated above not being limited and certain of the steps can take place simultaneously.

Other features of the invention will emerge from the detailed description given below, with reference to the figures of the accompanying drawings in which.

Figure 1:
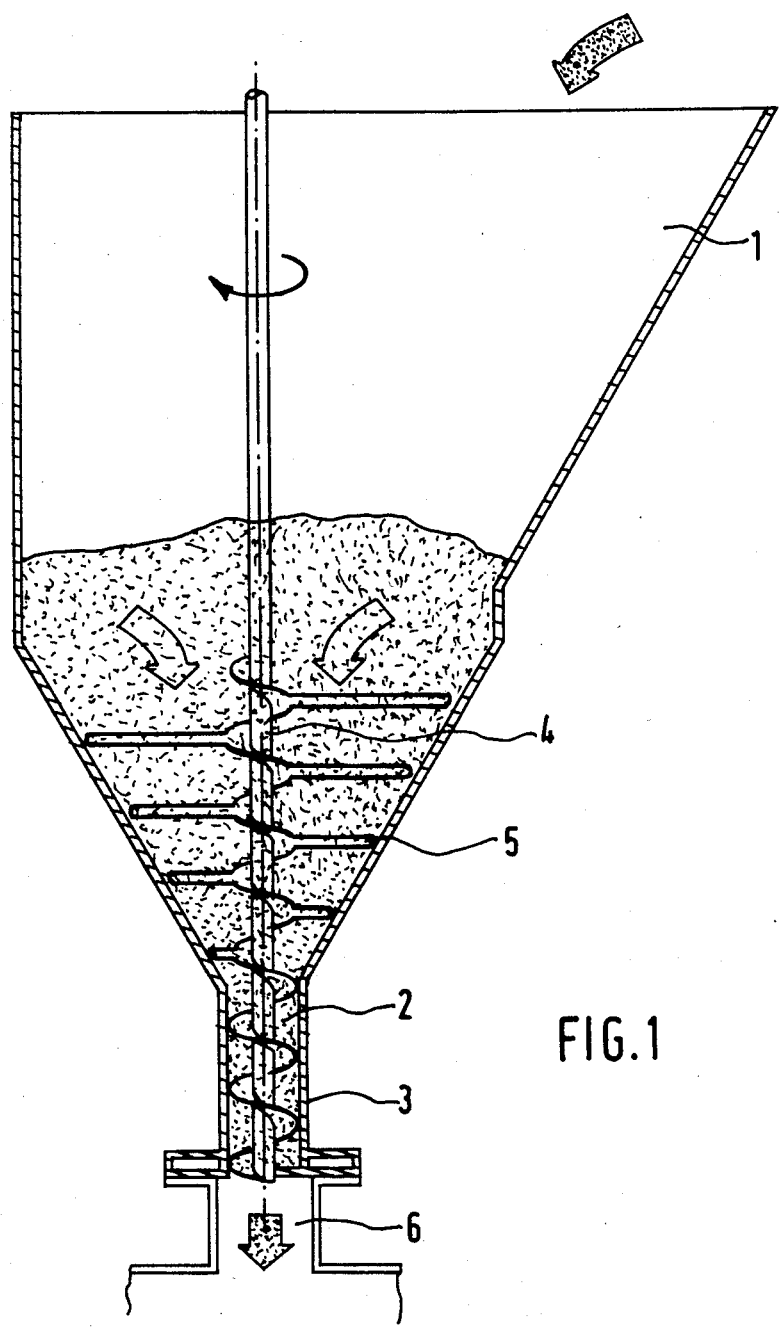
FIG. 1 is a view in elevation and in section of the hopper showing also the passage of the carbon to be regenerated from the hopper into the reactor.

As shown in FIG. 1, the feed device is composed of a hopper of 1 to 50 liters, whose distributor 2 is a vertical Archimede screw rotating just within a feed tube 3 which opens at the input end of the furnace. On the shaft of the screw 4, inclined blades 5 stir the carbon and push it towards the screw, which provides the fluid tightness of the input end of the reactor 6.

Figure 2:
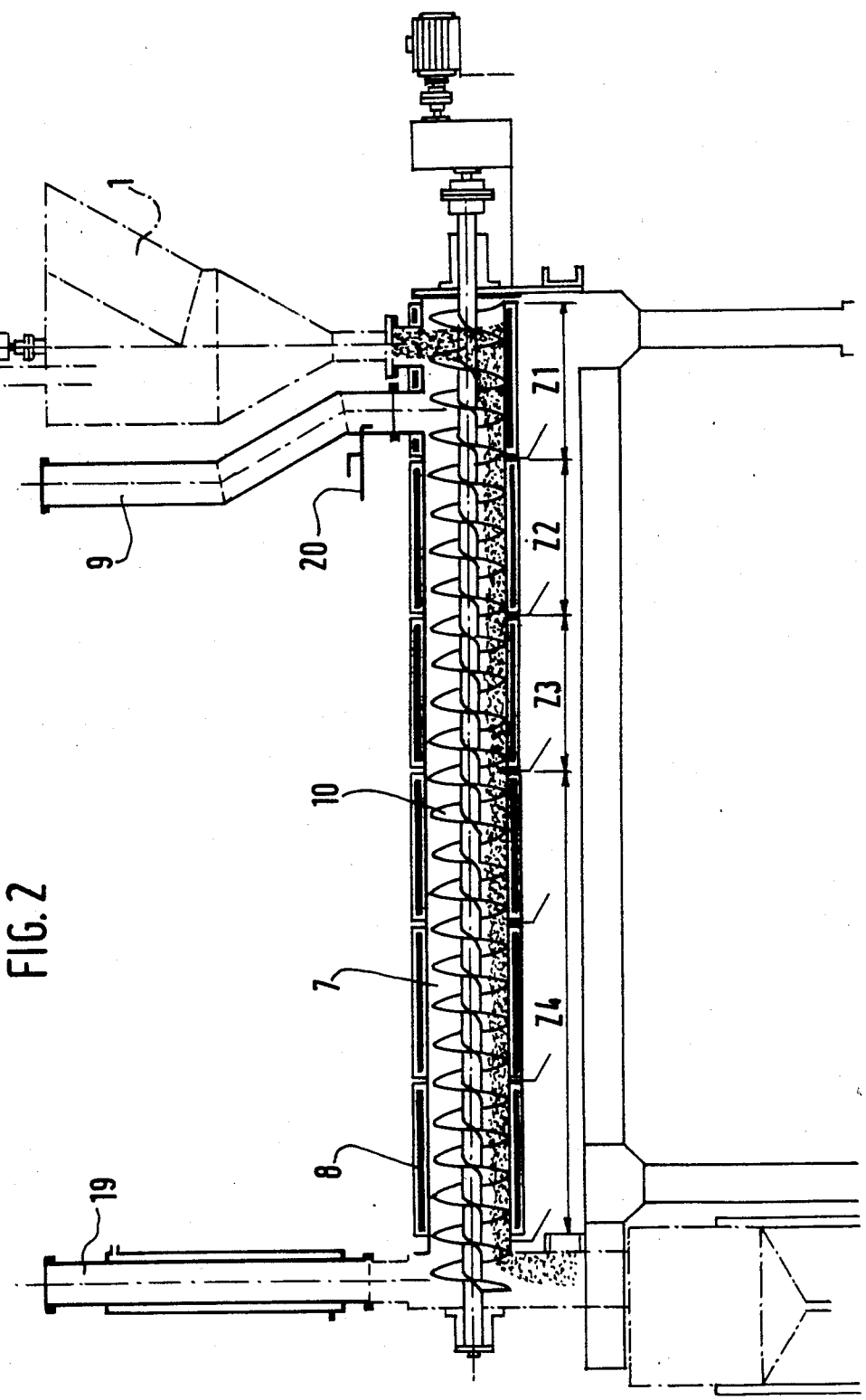
FIG. 2 is a view in elevation and in section of the regeneration installation representing the hopper, the reactor and the recovery device for the regenerated active carbon.

As regards the reactor shown in FIG. 2, this is a horizontal cylinder 7 whose ratio between the length (L) and diameter ( ) is equal to 12, heated by six resistances 8 distributed into four zones, separately regulated.

The zones 1 and 2, of the input of the furnace, at L/3, provides the evaporation of the water contained and raise the carbon to temperature.

The zones 3 and 4, at L/3, ensures the reaction temperature for the required time.

At the head of the heating body, a vent 9 permits decompression, if necessary and the possible addition of steam or of neutral gas.

Six probes, distributed over the length, control the temperature of the carbon.

Above the output of the reactor, a cooled chimney 19, with a regulatable aperture, condenses a fraction of the steam coming from the reactor, which traps the flying particles.

The transport of the carbon in the tube is achieved by a continuous Archimedes screw 10 whose pitch is equal to one half the diameter of the screw.

This screw is positioned as close as possible to the lower generating line of the reactor, for example, at a distance of about 1 mm, the unoccupied crescent being reserved for the circulation of gases (see FIG. 3 below).

There are provided, in the body of the reactor, injectors 20 for water, or neutral gas, to regulate the pressure and the steam inside the reactor during the reaction or in the case of an accident, and to enable the addition of steam, particularly on the starting up of the apparatus and the addition of neutral gas, particularly on stopping during the cooling period.

Figure 3:
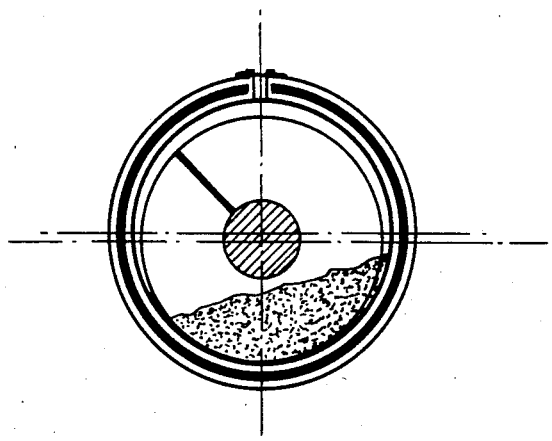
FIG. 3 is a view in section along a diameter of the reactor showing the position of the axis of the Archimedes screw and of the reactor.

FIG. 3, represents a section along the diameter of the reactor, which shows the possible decentering between the axis of the Archimede screw and the axis of the reactor.

By reason of the decentering, in the upper part of the reactor, there is a space whose generating surface is in the form of a crescent which enables the circulation of the gases.

Figure 4:
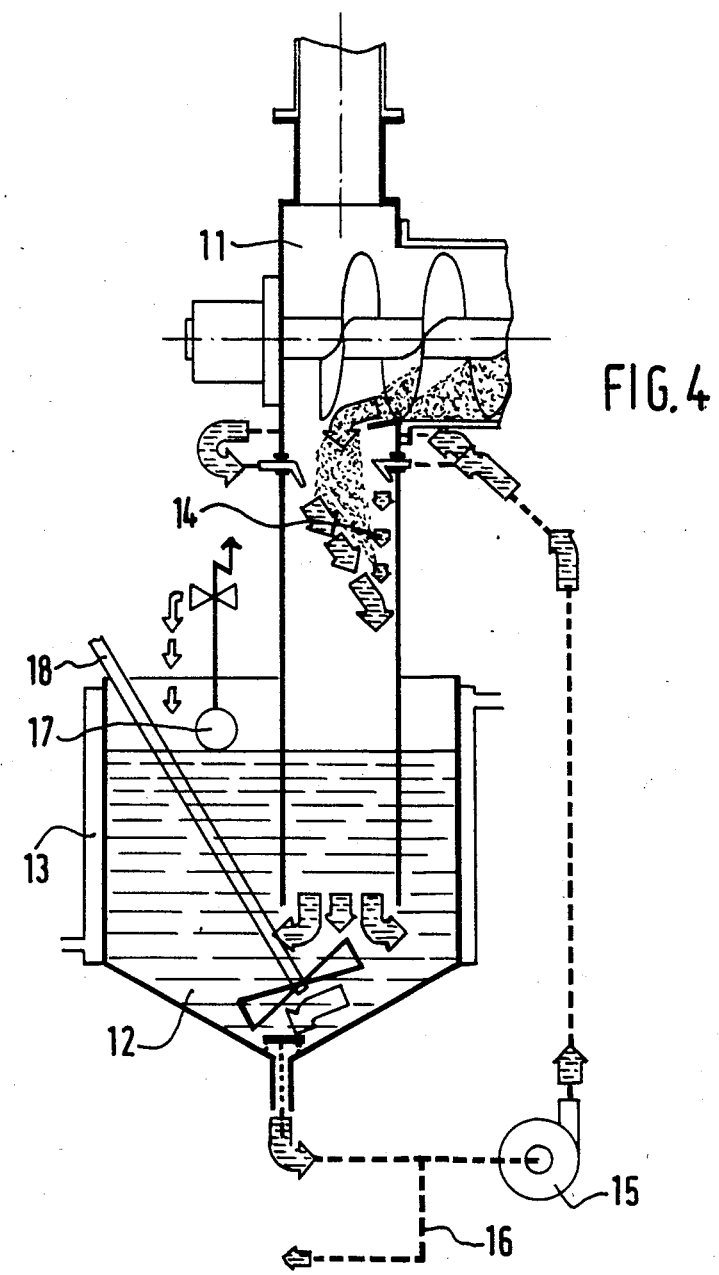
FIG. 4 is a view in elevation and in section of the recovery device, situated at the unload end portion of the reactor.

FIG. 4 shows the recovery device. It is composed of a coffer 11, into which the conveyor screw unloads. This parallelepipedic coffer dips into a water tank 12, maintained by an exchanger 13 at a temperature close to room temperature; on the inside, two crossed waterfalls 14 trap the carbon falling from the reactor and emerse it in the tank; a water-carbon pulp is therefore formed in the tank, whose homogeneity is maintained by a stirrer 18.

The two waterfalls absorb, in addition, the steam produced in zones 1 and 2 of the reactor. The reduced pressure created in the furnace by the condensation enables the flow in cocurrent of the steam. The two waterfalls are supplied from the cooling tank by a centrifugal pump 15 on the intake of which a volumetric pump 16 takes up water-carbon pulp and evacuates it to the process. A float valve 17 compensates with fresh or recycled water the volume taken up and keeps the level constant in the tank.

The installation and the method according to the invention are used both for carbon in powder form, and carbon in grains.

The active carbon to be regenerated comes mostly from purification treatments in which it has been used.

The carbon to be regenerated can come particularly from a sodium sulfate purification installation.

This active carbon is in the form of very fine powder in which 90% of the particles have a diameter less than 80 μm. This carbon has a humidity level of about 50% and an apparent specific weight of 0.5, when it is moist and 0.3 when it is dry.

This carbon is saturated by organic substances (essentially humic acids) and can contain also molybdenum in the form of molybdic acid.

The contents of active carbon is about 10% by weight of organic substances and 2% of molybdenum.

Before being introduced into the hopper, the carbon containing the molybdenum, is advantageously subjected to an operation whose purpose is to convert the molybdic acid into sodium molybdate, followed by a solid-liquid operation.

To convert the molybdic acid into sodium molybdate, it is possible, for example, to soak the active carbon with soda, which can be chemically represented by the following reaction:

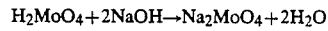

$$H_2MoO_4 + 2NaOH \rightarrow Na_2MoO_4 + 2H_2O$$

Considering that the sodium molybdate is soluble in water, it will be removed by washing in the coffer.

In the reactor, the contaminating organic substances are pyrolysed under an atmosphere, saturated with steam containing neutral gases, at the temperature of about 500° C., for about one hour.

In the course of the last stage, when the regenerated carbon is immersed in the water of the tank, there is removal of all the soluble substances in the water present in the active carbon and essentially the molybdate and sulfate of sodium.

The general example below relates to the description of the electrical mechanical characteristics of an installation according to the invention, as well as indications relative to the process.

The hopper has a volume of 50 liters and includes an Archimedes feed screw whose rotation can vary from 0 to 4 rpm, which permits a feed flow rate of dry carbon recovered at the exit from the treatment process of 0 to about 10 kg/hour. This corresponds to the introduction of 0 to about 20 kg of wet carbon per hour into the hopper, in the case of an active carbon to be regenerated containing about 55% of moisture.

On the average, the flow rate of carbon introduced into the hopper is 10 kg/hour, which corresponds to the recovery of 5 kg/hour of dry carbon.

The reactor is a cylinder of 2.4 m length and 211 mm diameter.

The conveyor screw for the active carbon in the tube comprises 20 steps and rotates at the speed of 0.1 to 1 rpm, providing a stay time of 20 to 200 minutes.

The respective adjustments of the two screws (feed screw and conveyor screw) enable the achievement of filling ratios ranging up to about 50% of the inner volume of the reactor.

In practice, this filling ratio is limited to values below about 45% and preferably comprised from 30 to 40%.

At the outlet of the reactor, the flow rate of water is adjusted so as to have in the coffer a liquid/solid ratio of about 10 m3/t.

The flow rate of the waterfalls is about 1 m3/hour.

The recycling of the carbon pulp obtained from the coffer at the outlet of the reactor is effected at the flow rate of 5 m3/hour.

The heating is done by ceramic resistances forming collars on the outside of the reactor.

The reactor is equipped with six cylindrical collars, 0.40 m in width of an inner diameter coinciding with the outer diameter of the reactor.

Each element has a power of 4 kW. The regulation of the heating is independent for each of the three first elements; the last three have a common regulation.

The electrical consumption of each of the regulation zones is recorded. In this way it is possible to define the distribution of the electrical consumption as a function of the length of the reactor. These measurements are indispensable for fixing the dimensions of the elements equipping an industrial furnace. In fact, high powered heating elements must be provided close to the input of the furnace and elements of lower power close to the output. The regeneration of a kilogram of carbon necessitates from about 1.3 to about 1.7 kcal.

As regards the regeneration processing of the active carbon, it is done in an atmosphere saturated with steam. This steam is generated by the evaporation of the liquid impregnating the active carbon whose moisture content is about 55%, and comes also from an external addition of steam.

As regards the atmosphere which generally exists inside the reactor in the course of the regeneration treatment of the active carbon in the installation, its composition is generally as follows:

1% of $O_2$,
4% of $N_2$,
about 0.3 g/m3 of dusts,
about 0.5% of CO,
about 0.8% of butane,
traces of methane,
about 93% of steam.

The respective values of the content of dusts, of CO and of butane are much less than the values corresponding to the explosion threshold.

For a flow rate of dry carbon of 10 kg/h, there is therefore a steam flow rate corresponding to the vaporisation of 12.2 l of water in the furnace. The steam is condensed in the chimney situated above the outlet end of the reactor. The internal pressure is kept very close to atmospheric pressure particularly by acting the trap situated at the top of the chimney.

The following examples relate to the treatment of active carbon in powder form of which the characteristics have just been indicated above.

EXAMPLE 1

66 kg of dry active carbon are treated at 500° C. for one hour, at the flow rate of 2 kg/h. The weight loss measured after reactivation is 11% with respect to the fresh carbon.

The quality of the carbon is tested by adsorption of molybdenum and of organic substances (expressed in total organic carbon: TOC) on solutions rich in impurities. The efficiencies of removal are then compared with those obtained with fresh carbon, as indicated in table 1 below.

TABLE I

|  | fresh active carbon | regenerated active carbon |
|---|---|---|
| Efficiency of removal Mo (%) | 90.9 | 86.4 |
| Efficiency of removal TOC (%) | 94.4 | 93.1 |

This example shows that the active carbon regenerated by the method according to the invention, in the installation according to the invention, has contents of organic substances and of molybdenum practically as low as those of the fresh active carbon and hence regeneration properties of the same nature, the loss of active carbon in the course of the regeneration being also low.

EXAMPLE 2

138 kg of dry saturated active carbon are treated at 500° C., for one hour, at the flow rate of 5.2 kg/h. The filling ratio of the furnace is 28%. The weight loss measured is 9.1%. The efficiencies of removal of molybdenum and organic substances are indicated in table II below.

TABLE II

|  | fresh active carbon | regenerated active carbon |
|---|---|---|
| Efficiency of removal Mo (%) | 90.9 | 86.4 |
| Efficiency of removal TOC (%) | 94.4 | 91.5 |

Here again, this example shows the method and the installation according to the invention enable the obtaining of a regenerated active carbon whose properties are of the same nature as the fresh active carbon, the loss of the active carbon in the course of the regeneration method being also low.

Within the scope of this example, an energy balance has also been made.

The electrical consumption of the furnace is 8.97 kWh, namely 1.72 kWh per kg of dry active carbon. The distribution of the use of this energy is indicated in table III.

TABLE III

|  | | Energy consumed | | Ratio of use of the element |
|---|---|---|---|---|
|  | | kWh | % | % |
| 1st element of 4 kW (feed side) | | 3.32 | 37 | 83 |
| 2nd element | | 1.59 | 18 | 40 |
| 3rd element | | 1.39 | 15 | 35 |
| 4th element | ⎫ | 0.89 | 10 | 22 |
| 5th element | measured | 0.89 | 10 | 22 |
| 6th element (output side) | together ⎭ | 0.89 | 10 | 22 |

This table shows the distribution of the consumption of the energy according to the state of the active carbon in the furnace, which state develops as a function of its position.

These results enable the conclusion that the thermal efficiency in the installation according to the invention is about 80%, whereas it is often less for previously known installations.

Different tests have also been carried out according to the method of invention, in the installation of the invention, to optimize the amount of energy expended whilst preserving the quality of the regeneration by causing the flow rate (reported as dry carbon) and the stay time to vary.

The results relating to the energy consumed for 1 kg of regenerated dry active carbon, as a function of the flow rate and of the stay time, are collected in table IV below.

The stay time corresponds to the passage of the active carbon over 2 m of the reactor given that over the first part of the reactor, that is to say in the example of the reactor described above, over about 40 m length, there is evaporation of the water and raising the temperature of the carbon.

It is therefore considered that the regeneration treatment itself takes place over 2 m of the reactor.

TABLE IV

| Flow rate of dry carbon kg/h | Stay time | Energy consumed kWh |
|---|---|---|
| 8.5 | 1 h | 1.26 |
| 8 | 1 h | 1.5 |
| 7.5 | 1 h | 1.43 |
| 5.65 | 50 min | 1.56 |
| 4.2 | 40 min | 1.98 |
| 8.5 | 40 min | 1.33 |
| 5.2 | 1 h | 1.72 |

These results are averages obtained in 4 or 5 hours, whereas the results relating to the flow rate of 5.2 kg/h correspond to an average obtained in 26 hours.

These results enable the observation, unexpectedly, that when the flow rate increases, for a given time, the consumption of energy dispensed to regenerate 1 kg of dry active carbon diminishes.

The flow rate however must not exceed a value beyond which the filling coefficient inside the reactor would exceed 50%, in practice 45%, and this all the more as the regeneration is a treatment which is done in the mass and, consequently, the good quality of the regeneration implies that the carbon layer is not too thick.

The regeneration treatment involves particularly three parameters: the flow rate, the stay time and the filling ratio, which themselves are interdependent.

For a given stay time, the energy expenditure is improved by increasing the flow rate, but the flow rate cannot be increased beyond the value corresponding to a filling ratio higher than 45%.

For a given flow rate, it is possible to reduce the filling ratio by reducing the stay time, but it cannot either be reduced below a value from which the regeneration no longer has time to be accomplished.

Advantageously, the flow rate is 8 kg/h, and the stay time is one hour, which corresponds to an energy of 1.5 kWh/kg of carbon.

If the flow rate is increased to the value of 8.5 kg/h for a stay time of one hour, the filling coefficient reaches 45%, consequently a limit value which it is better to avoid.

If, for a flow rate of 8.5 kg/h, the filling ratio is reduced by reducing the stay time, by passing, for example, to 40 minutes, then the quality of the regeneration is not sufficient, since the stay time is then too short.

The invention is not limited to the above described embodiments, but encompasses all modifications.

We claim:

1. In an apparatus for regenerating a particulate material which includes (a) an enclosed reactor having an input end and an output end; (b) means for introducing said material, to be regenerated, into said input end of said reactor; said material introducing means being in air-tight communication with said input end; (c) a shaft with blades or a first Archimedes screw within said reactor and extending continuously between said input and output ends of said reactor to transport said material all the way from said input end to said output end; and (d) means for substantially uniformly heating the inside of said reactor and thereby heating said material to regenerate said material and form gaseous byproducts; the improvement which comprises:

(e) means for providing an atmosphere inside said reactor that: (i) contains steam, (ii) is saturated with water vapor and (iii) is close to atmospheric pressure; and (f) means in communication with said output end for: (i) evacuating said gaseous byproducts, (ii) condensing steam from said reactor, (iii) trapping particles of said material in said gaseous byproducts and steam from said reactor; and (iv) transporting said material from said output end; said means (f) for evacuating, condensing, trapping and transporting providing a relatively reduced pressure at said output end which causes steam, inside said reactor, to circulate cocurrently with said material as it is transported through said reactor.

2. The apparatus of claim 1, wherein said material, to be regenerated, is active carbon and said means (d) for heating the inside of said reactor pyrolyzes contaminating substances on said active carbon to form said gaseous byproducts.

3. The apparatus of claim 1, wherein said means (b) for introducing said material into said input end comprises a vertically arranged hopper above said input end; said hopper having an upper orifice for introducing said material into said hopper and a lower orifice for unloading said material into said input end.

4. The apparatus of claim 3, wherein said lower orifice of said hopper is connected to said input end by a feed tube containing a second Archimedes screw for transporting said material from said lower orifice to said input end.

5. The apparatus of claim 1, wherein said reactor is enclosed in a horizontal cylindrical sheath in which said material is transported by said first Archimedes screw; the axis of said first Archimedes screw being decentered with respect to the axis of said cylindrical sheath so that there is a space within said sheath above said first Archimedes screw.

6. The apparatus of claim 5, wherein said means (d) for heating the inside of said reactor comprises a resistance heater outside of said sheath.

7. The apparatus of claim 6, wherein said resistance heater comprises a plurality of resistance heaters positioned on the outer surface of said sheath along the axis of said sheath.

8. The apparatus of claim 7, wherein each of said plurality of resistance heaters comprises a collar about said sheath.

9. The apparatus of claim 5, wherein said means (d) for heating the inside of said reactor comprises a magnetic induction heating means outside of said sheath.

10. The apparatus of claim 1, wherein said means (f) for evacuating, condensing, trapping and transporting comprises a cooled chimney which is above said output end and into which pass said gaseous byproducts, steam from said reactor and particles of said material in said gaseous byproducts and steam from said reactor; said chimney having an adjustable bottom opening in communication with said output end.

11. The apparatus of claim 10, wherein said means (f) for evacuating, condensing, trapping and transporting further comprises a coffer beneath said output end and beneath said chimney; said coffer containing:

(g) means for cooling said material and condensing steam from said reactor.

12. The apparatus of claim 11, wherein said means (g) for cooling said material and condensing steam in said coffer comprises a water spray within said coffer; and wherein said coffer connects said output end to a cooling water bath for said material beneath said output end.

13. The apparatus of claim 12, wherein said water spray is provided by crossing waterfalls in said coffer.

14. The apparatus of claim 1, wherein said means (e) for providing an atmosphere inside said reactor comprises means for injecting water, steam or a neutral gas into said reactor.

15. The apparatus of claim 14, wherein said means (e) for providing an atmosphere inside said reactor also comprises a chimney close to said input end of said reactor.

16. The apparatus of claim 15, wherein said means (e) for providing an atmosphere inside said reactor comprises means for injecting steam into said reactor close to said input end of said reactor.

17. In an apparatus for regenerating active carbon which includes: (a) a vertically arranged hopper having an upper orifice for introducing said active carbon, to be regenerated, and a lower orifice for unloading said active carbon; (b) means for unloading said active carbon from said lower orifice of said hopper; (c) an enclosed reactor having an input end and an output end; said input end being in air-tight communication with said lower orifice of said hopper; (d) a shaft with blades or a first Archimedes screw that is inside said reactor and extends continuously between said input and output ends of said reactor to transport said active carbon all the way from said input end to said output end; and (e) means outside of said reactor for substantially uniformly heating the inside of said reactor and thereby heating said active carbon to regenerate said active carbon and form gaseous byproducts; the improvement which comprises:
(f) means for providing an atmosphere inside said reactor that: (i) contains steam, (ii) is close to atmospheric pressure and (iii) is saturated with water vapor by injecting water, steam or a neutral gas into said reactor;
(g) a cooled chimney above said output end of said reactor and in communication with said output end for: (i) evacuating said gaseous byproducts, (ii) condensing steam from said reactor and (iii) trapping particles of said active carbon in said gaseous byproducts and steam from said reactor; and
(h) a coffer beneath said output end of said reactor, connecting said output end to a cooling water bath beneath said output end; said coffer containing means for spraying said active carbon with water as said active carbon falls through said coffer to cool said active carbon and condense steam from said reactor;
said condensation of steam from said reactor by said chimney and coffer causing a relatively reduced pressure at said output end which causes steam, inside said reactor, to circulate cocurrently with said active carbon as it is transported through said reactor.--

18. The apparatus of claim 17, wherein said means (b) for unloading said active carbon from said lower orifice of said hopper comprises a second Archimedes screw within said lower orifice.

19. The apparatus of claim 18, wherein said second Archimedes screw is within a feed tube connecting said lower orifice and said input end of said reactor.

20. The apparatus of claim 18, wherein said reactor is enclosed in a horizontal cylindrical sheath, in which said active carbon is transported by said first Archimedes screw; the axis of said first Archimedes screw being decentered with respect to the axis of said cylindrical sheath so that there is a free space above said first Archimedes screw.

21. The apparatus of claim 20, wherein said (e) means for heating the inside of said reactor comprises a resistance heater outside of said sheath.

22. The apparatus of claim 21, wherein said resistance heater comprises a plurality of resistance heaters positioned on the outer surface of said sheath along the axis of said sheath.

23. The apparatus of claim 22, wherein each of said plurality of resistance heaters comprises a collar about said sheath.

24. The apparatus of claim 20, wherein said means (e) for heating the inside of said reactor comprises a magnetic induction heating means outside of said sheath.

25. The apparatus of claim 17, wherein said chimney has an adjustable bottom opening in communication with said output end.

26. The apparatus of claim 25, wherein said means for spraying said active carbon with water in said coffer comprises crossed waterfalls.

27. The apparatus of claim 26, wherein said means (f) for providing an atmosphere inside said reactor also comprises a chimney close to said input end of said reactor.

* * * * *